Figure 1:
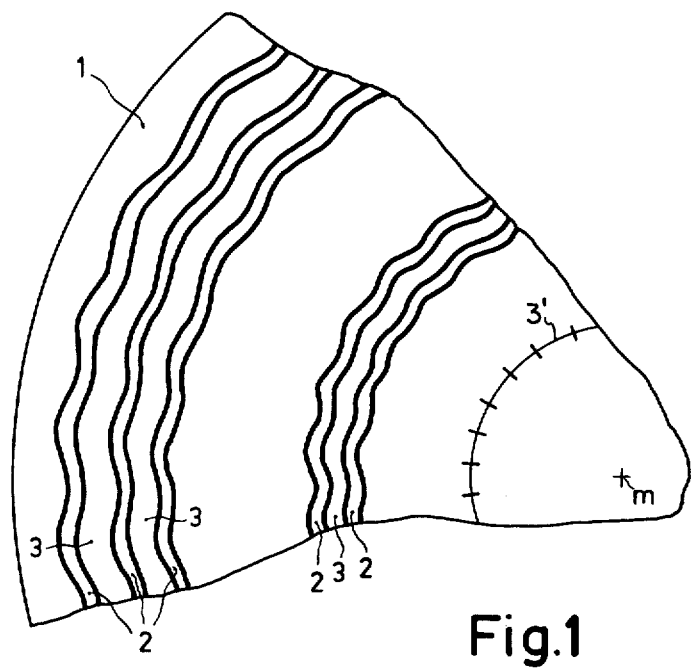

United States Patent [19]

Bouwhuis et al.

[11] 4,223,347
[45] Sep. 16, 1980

[54] VIDEODISC WITH UNDULATING NESTED TRACKS

[75] Inventors: Gijsbertus Bouwhuis; Pieter Kramer, both of Eindhoven, Netherlands

[73] Assignee: U.S. Philips Corporation, New York, N.Y.

[21] Appl. No.: 442,396

[22] Filed: Feb. 14, 1974

[30] Foreign Application Priority Data

Oct. 17, 1973 [NL] Netherlands ............... 7314267

[51] Int. Cl.$^2$ ............................................. A04N 5/76
[52] U.S. Cl. ........................ 358/128.5; 179/100.3 V;
179/100.3 D; 360/77; 346/108; 250/202;
274/46 R
[58] Field of Search ............... 179/100.3 V, 100.3 D,
179/100.3 Z, 100.3 N, 100.4 A, 100.4 C;
178/6.7 A, 6.6 R, 6.6 DD; 360/77, 70; 274/41.6
R, 46 R, 42 R; 340/173 LM; 358/128, 127, 130,
132; 250/201, 202, 203, 570; 346/108, 166, 157,
120, 124, 127

[56] References Cited

U.S. PATENT DOCUMENTS

| | | |
|---|---|---|
| 3,126,535 | 3/1964 | Streeter .................................. 360/77 |
| 3,501,586 | 3/1970 | Russell .................................. 358/132 |
| 3,534,166 | 10/1970 | Korpel .............................. 178/6.6 R |
| 3,663,764 | 5/1972 | Trost ...................................... 360/70 |
| 3,673,412 | 6/1972 | Olson .................................. 250/202 |
| 3,701,846 | 10/1972 | Zenzefilis ........................ 178/6.7 A |
| 3,796,825 | 3/1974 | Redlich ............................ 178/6.6 DD |
| 3,798,388 | 3/1974 | Dickopp ........................... 179/100.3 V |
| 3,829,605 | 8/1974 | Dickopp ........................... 178/5.4 CD |
| 3,833,769 | 9/1974 | Compaan ....................... 179/100.3 V |
| 3,860,766 | 1/1975 | Mori ............................... 179/100.4 R |
| 3,931,460 | 1/1976 | Watson ........................... 178/6.6 DD |

OTHER PUBLICATIONS

"Philips On Printing Motion", by Kramer and Compaan, Eduology, vol. 4, issue 1, 1973.

*Primary Examiner*—James W. Moffitt
*Assistant Examiner*—Alan Faber
*Attorney, Agent, or Firm*—Thomas A. Briody; William J. Streeter; Simon L. Cohen

[57] ABSTRACT

A record carrier is described on which information is stored in an optically readable structure of trackwise arranged areas and intermediate areas. By giving the information tracks periodic excursions towards and away from adjacent tracks, in a direction transverse to the direction of reading, the period of the excursions being substantially greater than the average period of the areas and the amplitude of the excursions being smaller than the width of the tracks, a control signal for centering the read beam of radiation on an information track can be obtained without the use of additional optical means. The excursions of the tracks have such relative phase that the tracks are in nested concentric relation and one component of the stored information represents the phase of the undulations.

4 Claims, 8 Drawing Figures

VIDEODISC WITH UNDULATING NESTED TRACKS

The invention relates to a record carrier on which information is stored in an optically readable structure of trackwise arranged areas alternating with intermediate areas, which areas have a different effect on a read beam of radiation than the intermediate areas and the lands between the tracks. The invention also relates to an apparatus for reading and to an apparatus for writing information on such a record carrier.

It has been prposed, for example in the previous Patent Application U.S. Ser. No. 229,285, filed Feb. 25, 1972 abandoned and now continuation application Ser. No. 396,399, filed Sept. 12, 1973 now abandoned, to store a color television program on a record carrier as described above. For example, on a round disc-shaped record carrier a 45-minute program can be stored in a multiplicity of concentric or quasi-concentric tracks, the outer track having a radius of approx. 15 cm and the inner track a radius of approx. 5 cm. The period of the tracks in a radial direction is then approx. 1.5 $\mu$m.

The record carrier can be read optically by focussing a read beam of radiation onto the optical structure, and by moving the radiation spot thus formed and an information track relative to each other. The read beam of radiation is then modulated in accordance with sequence of areas and intermediate areas in a track. A radiation-sensitive detector converts the modulated beam of radiation into an electrical signal, from which, for example, picture and/or sound can be derived.

In order to prevent the occurrence of cross-talk between adjacent tracks during reading, or to prevent the modulation depth of the information signal from becoming too low, the center of the radiation spot formed in the information structure by the beam of radiation must always be projected in the center of a track to be read. For this purpose the position of the radiation spot must be detected and corrected continually.

In the previous pending Patent Application U.S. Ser. No. 345,644 filed Mar. 28, 1973, now U.S. Pat. No. 3,876,842 it has been proposed that during reading of a record carrier with an optical structure apart from a radiation spot for reading the information stored in the areas and the intermediate areas in a strack two additional radiation spots be projected onto the optical structure. The additional radiation spots are shifted by half a track width in opposite directions relative to the read spot of radiation. Each of the additional radiation spots has an associated additional radiation-sensitive detector. By comparing the electrical signal supplied by the additional detectors it is possible to ascertain whether the radiation spot for detecting the information is correctly centered on the track and in which direction a possible deviation occurs.

Said known apparatus, however, apart from the optical components required for reading the information, includes a number of additional components, such as two additional detectors and means for forming additional radiation beams. When assembling the apparatus, special attention must be paid to the alignment of said additional components. Moreover, previsions have to be taken in order to compensate for vibrations which may occur between the additional components during reading. In the known apparatus the available radiation energy must be divided among three detectors, so that the signal per detector is small.

It is an object of the invention that in reading or record carrier of the type mentioned in the preamble, apart from an information signal, a signal for re-alignment the read spot of radiation is produced without the use of additional optical components. In order the achieve this the record carrier according to the invention is characterized in that the tracks, viewed in a direction transverse to the direction in which the tracks are read, exhibit periodic excursions, the period of said excursions being substantially greater than the average period of the areas in the tracks and the amplitude of said excursions being smaller than the track width.

The period of the excursions must be so much greater than the average period of the areas that in the detected signal the modulation as a result of the information can be readily discriminated as regards frequency from the modulation as a result of the excursions. For a record carrier provided with a television program the period of the excursions is a few hundreds of times greater than the average period of the areas in a track. The amplitude of the excursions must be so much smaller than the width of the tracks that a sufficiently large portion of the read spot of radiation is always incident on the track to be read. Said amplitude is for example one tenth of the track width.

A record carrier according to the invention can be read by means of only one beam of radiation and one detector. The information, for example picture and/or sound information, can be derived from the high-frequency components of the electrical signal supplied by the detector, while a control signal can be derived from the low-frequency component.

It is to be noted that it has been proposed previously for example in U.S. Pat. No. 3,673,412, that when reading a record carrier both the information and a control signal be derived from the signal supplied by a single detector. For reading the record carrier described in said Patent use is made of separate follow-on tracks, which follow-on tracks are provided with a low-frequency control signal. The follow-on tracks are disposed between the information tracks. However, as a result of this, the number of information tracks per unit of length in a direction transverse to the read direction is low. In the record carrier according to the invention the information track itself performs the function of the follow-on track.

Another possibility of deriving an information signal and a control signal for tracking by means of a single detector element is described in U.S. Pat. No. 3,126,535. Said Patent however, relates to a magnetic record carrier. When said record carrier is being read an oscillatory motion transverse to the longitudinal direction of the track is imparted to the magnetic read head. As a result an amplitude modulation is impressed on the information signal, whose phase and amplitude provide an indication of the position of the read head relative to the track to be read. For causing the read head to oscillate additional means are required, which substantially complicates the read apparatus.

Figure 2:
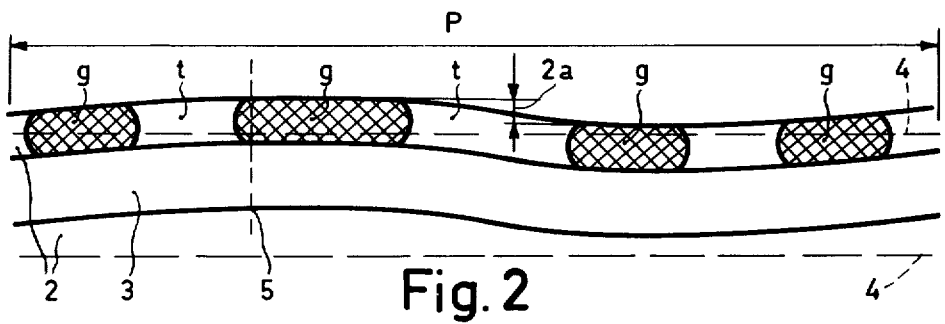
Figure 5A:
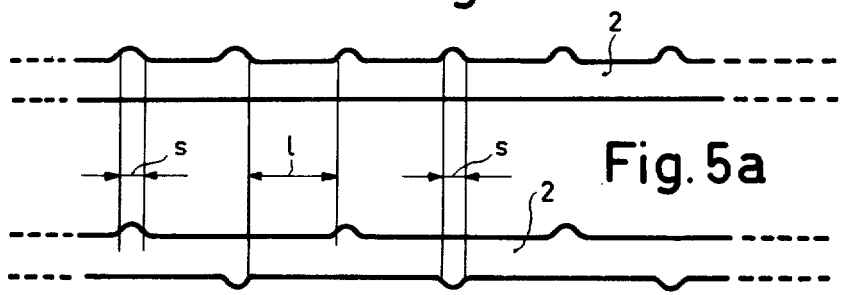
Figure 5B:
Figure 3:
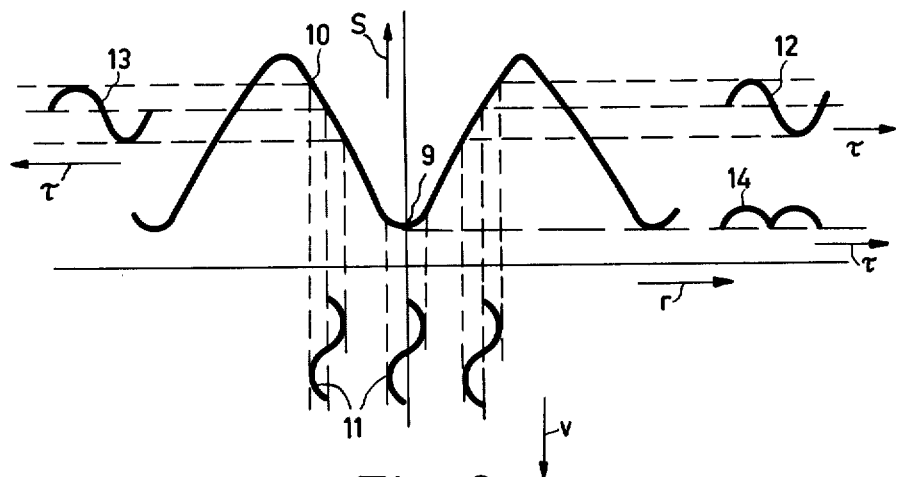
Figure 4:
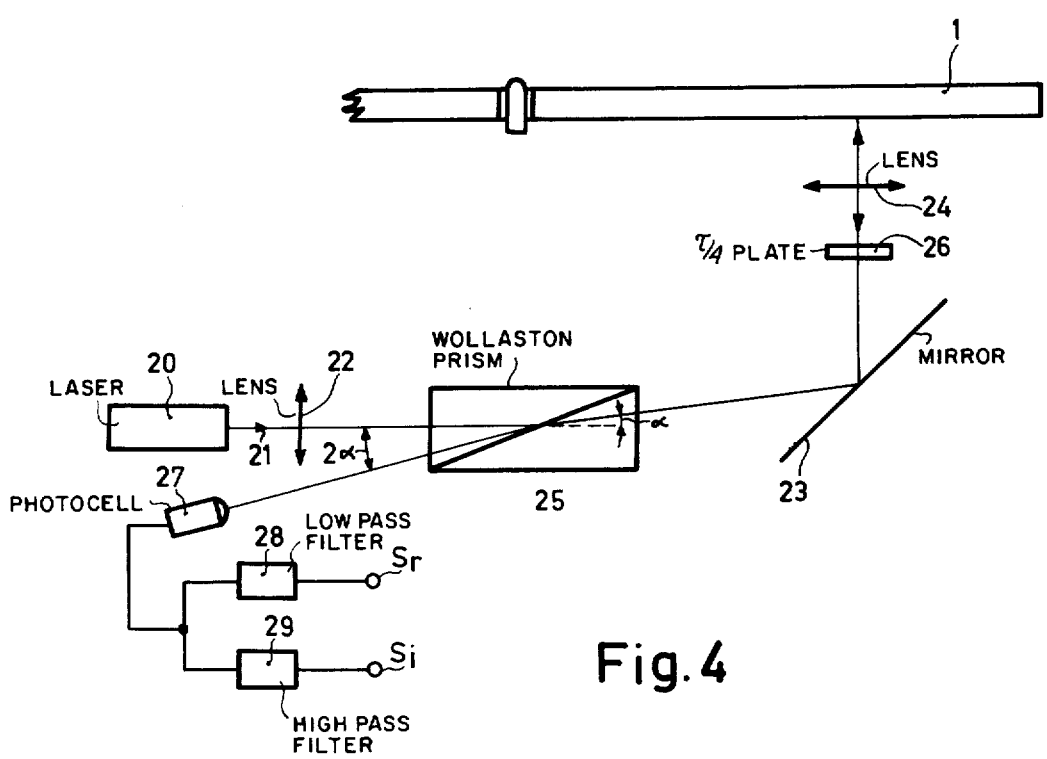
Figure 6:
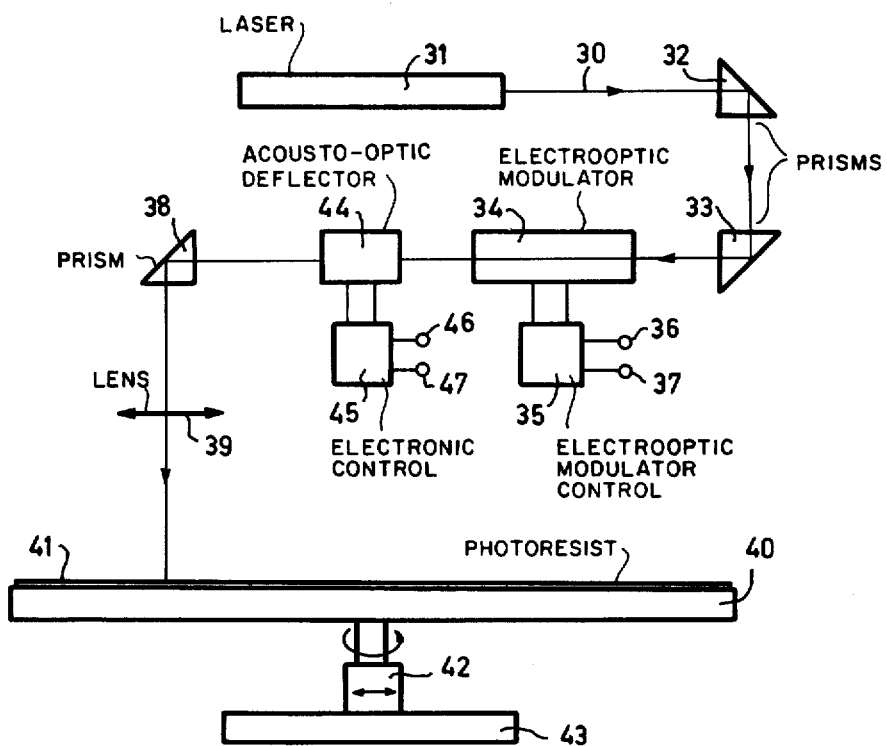
Figure 7:
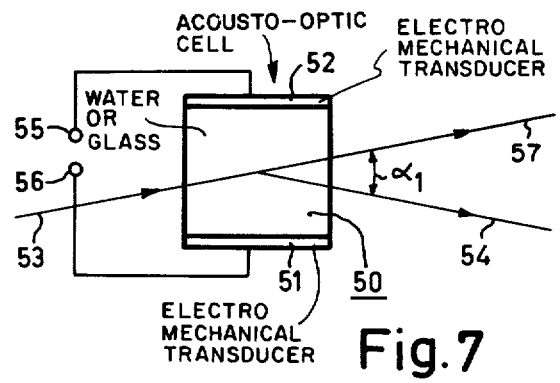

The invention will now be described with reference to the drawing, in which:

FIG. 1 shows a part of a round record carrier with a first embodiment of an optical structure according to the invention, FIG. 2 shows a part of one track of such an optical structure, FIG. 3 illustrates the variation of the low-frequency detector signal as a function of the radial displacement of the read spot of radiation relative to said track, FIG. 4 shows an apparatus for reading a record carrier according to the invention, FIG. 5a and 5b show a part of two other embodiments of an optical structure according to the invention, FIG. 6 shows an apparatus for writing an optical structure according to the invention on a record carrier body, and FIG. 7 represents an acoustc-optic modulator for use in such an apparatus.

The round record carrier 1 in FIG. 1 contains a multiplicity of concentric or quasi-concentric tracks 2, of which only a few are shown. Between the information tracks 2 information-free lands 3 are located.

As can be seen in FIG. 2, the tracks 2 contain areas g alternating with intermediate areas t. The lengths of the areas and the intermediate areas represent the stored information. When a track is being read a read beam of radiation is modulated, so that said radiation beam exhibits time variations in accordance with the squence of areas and the intermediate areas in a track.

The areas in a track can be discriminated from the intermediate areas and lands between the tracks in various manners. For example, the transmission or reflection coefficient of the areas may differ from that of the intermediate areas, so that a read beam of radiation is amplitude modulated. It is also possible that the areas impress a different phase on a read beam of radiation than the intermediate areas. This can be achieved by arranging the areas and intermediate areas at different heights in the record carrier. Preferably a phase structure consists of a number of pits which are pressed in a reflecting record carrier at a depth of $\lambda/4$, $\lambda$ being the wavelength of the radiation used for reading.

Said structure of pits can for example be read by means of a radiation spot whose diameter is greater than the track width, but smaller than the sum of the widths of a track and two lands. By imaging the optical structure via a lens of limited numerical aperture onto a detector, it is achieved that when the radiation spot is projected outside a pit the detector receives a certain amount of radiation, while if the radiation spot is projected onto a pit substantially no radiation reaches the detector owing to the occurrence of diffraction.

According to the invention and as can be seen in FIGS. 1 and 2, the tracks exhibits periodic excursions in a radial direction. It is to be noted that in FIG. 2 the lengths of the areas g have been exaggerated relative to the period p of the excursions. In reality the period p is some hundreds of times greater than the average length of the areas g. When the read spot of radiation is moved over the track, an additional modulation apart from a modulation as results of the sequence of areas and intermediate areas, is impressed on the read beam owing to the excursions.

FIG. 3 only shows the additional modulation; the high frequency information modulation is not considered. It has been assumed that a radiation spot greater than the width of a track is projected on the record carrier. If the center of said radiation spot coincides with the center (9) of a track, the detector receives a minimum amount of radiation. During low-frequency reading a track behaves as a channel in the record carrier which partly diffracts the radiation beyond the detector aperture.

The curve 10 in FIG. 3 represents the signal S supplied by the detector as a function of a displacement of the center of the radiation spot in the radial direction across several tracks if the tracks would exhibit no periodic excursions. Said excursions themselves may be represented by the waveforms 11. V is the direction in which the track is being read.

If the center of the radiation spot is located to the right of the center 9 of a track, the detector signal will be time modulated by the signal 12 when the radiation spot is moved over the track in the direction v. $\neq$ is the direction of increasing time.

If the center of radiation spot is located to the left of the center 9 of a track, the detector signal is time modulated by the signal 13. Said signal exhibits a 180° phase shift relative to the signal 12. The phase of the low frequency component of the detector signal in determined by the sign of a deviation between the center of the radiation spot and the center of the track.

If the center of the radiation spot coincides with the center of a track, a signal 14 is obtained with a frequency that is twice that of signals 12 or 13.

The phase of the low-frequency signal which is produced as a result of the periodic excursions of the tracks, is compared with a reference signal. Said reference signal might be produced by separate reference marks on the record carrier, which reference marks are detected by a separate read head. The marks may for example be mechanically, magnetically or optically detectable marks. In the case of a round record carrier the reference marks may be provided in a separate track 31 at the inner or outer circumference of the record carrier. If the information stored in the record carrier is a television program, the phase of the excursions can be brought in synchronism with the line synchronizing pulse in the video signal, so that the reference signal for the phase discrimination can be derived from the information signal and said signal need not be produced by additional means.

So far, the actual information on the record carrier has not been considered. In reality, the signal obtained from the detector will be the sum of one of the low-frequency signals 12, 13 or 14 and a high-frequency information signal which results from the sequence of areas and intermediate areas with a high spatial frequency in a track.

Instead of the sinusoidal excursions shown in FIGS. 1, 2 and 3 the track may, of course, exhibit other excursions, for example triangular ones, provided that said excursions are periodic.

For an embodiment of a round disc-shaped record carrier according to the invention, on which a 45-minute television program was stored between an outer track of a radius of 15 cm and an inner track of a radius of 5 cm, the average period of the areas was approx. 1 $\mu$m. The period of the tracks in a radial direction was approximately 2 $\mu$m. The spatial period p (see FIG. 2) of the periodic excursions was approximately 1 mm, while the amplitude of the excursions (a in FIG. 2) was approx. 0.1 $\mu$m.

FIG. 4 schematically shows an apparatus for reading a record carrier according to the invention. A radiation source 20, for example a laser source, supplies a radiation beam 21 of which for simplicity only one ray is shown. The radiation beam passes through a first lens 22, is subsequently reflected by the mirror 23 and then traverses the objective lens 24. The lens 22 ensures that the entrance pupil of the objective lens is completely filled. Said last-mentioned lens 24 concentrates the beam to a small spot of radiation on a portion to be read of a track on the record carrier 1. Said record carrier is reflecting, so that the modulated read beam of radiation returns along the same path. The radiation path furthermore includes a bi-refringent element 25, such as a Wollaston prism. The linearly polarized beam of radiation 21 emerging from the source 20 is diffracted at the angle $\alpha$ by the prism. By including a $\lambda/4$ plate 26 between said prism and the record carrier, which plate when it is traversed twice introduces a 90° shift of the plane of polarization of the radiation beam, the radiation beam reflected by the record carrier is diffracted to the radiation-sensitive detector 27 at an angle $2\alpha$ to the original direction.

The output signal of the detector 27 is fed to a low-pass filter 28, which, for example, passes frequencies up to 16 kHz and to a high-pass filter 29, which, for example, transmits frequencies up from 100 kHz. At the outputs of the filters 28 and 29 signals $S_i$ and $S_r$ appear. From $S_r$ a control signal for the position of the read spot of radiation can be derived, and from $S_i$ the information, for example vision and sound, can be derived.

The control signal, for example through rotation of the mirror 23, makes it possible to ensure that the center of the radiation spot is always projected onto the center of a track, which in FIG. 2 is designated by a dashed line 4.

Owing to the periodic excursions of the tracks, the distance from the center of a track to the edge of an adjacent track will periodically be small (for example for position 5). As a result, local crosstalk between adjacent tracks may occur. In the case that a television program is stored in a round disc-shaped record carrier, being recorded with one frame per revolution, the annoying effect of the crosstalk can be eliminated according to the invention, by giving the tracks a periodic excursion only at the locations which correspond to the line synchronizing pulses in the television signal. FIG. 5a shows a part of such a track. The video information is contained in the track portions 1. The reference letter s denotes the track portions in which the line synchronizing pulses are stored. Said line synchronizing pulses do not contain any visible picture information, so that there is no risk of visible crosstalk. The track portions s are approx. 1/5 of the track portions in which a full television line is contained (1 +s). The track portions s have a sufficiently high spatial frequency, they recur for example 625 times per revolution, so that the control signal derived therefrom is of sufficiently high frequency.

FIG. 5b represents a part of a preferred embodiment of a track with radially projecting track portions s. The track portions s are alternately offset to the left and to the right relative to the center of the track. By means of such a track correction is effected so that the center of the radiation spot coincides. with the center of a track. For a track as shown in FIG. 5a correction would be such that the center of the radiation spot would be slightly offset relative to the center of the track in the direction of the excursions.

FIG. 6 shows an apparatus for providing a record carrier body with an optical structure according to the invention. The apparatus includes a radiation source 31, for example a laser source, which supplies a radiation beam 30 of sufficient power, which beam is represented by one ray. The radiation beam 30 is directed at the record carrier body 40 to be written via the prisms 32, 33 and 38, and is concentrated to a small radiation spot by an objective lens 39. The record carrier body 49 is provided with a radiation sensitive layer 41, for example a photo-resist layer. The radiation path from the source 31 to the record carrier body 40 includes an optical intensity modulator 34. Said modulator is connected to the electronic control means 35. The information, for example a television program, which is applied to the terminals 36 and 37 in the form of an electrical signal, is converted into pulses of radiation from the source 31. At certain instants, given by the information at the terminals 36 and 37, radiation spots of specific intensity are directed at the record carrier body. The modulator 34 may be an electro-optic modulator and consist of an electro-optic crystal which, independently of the voltage applied to it, rotates the plane of polarization of a radiation beam, and an anolyzer which converts the variation in orientation of the plane of polarization into an intensity variation.

According to the invention the write apparatus incorporates a direction modulator 44, which varies the direction of the radiation beam 30 through very small angles, depending on the signal at the terminals 46 and 47 of the electronic control means 45. The direction modulator may be an acousto-optic deflector.

FIG. 7 represents an acousto-optic cell. The cell is provided with two electro mechanical transducers 51 and 52, which are connected to the electrical terminals 55 and 56. When an electrical signal is applid to the terminals 55 and 56, acoustic waves of a certain frequency are produced in the medium of the cell, for example glass or water. This results in Bragg diffractions in the medium of the cell, so that a radiation beam 53 is partly deflected at an angle $\alpha_1$ as a sub-beam 54. The magnitude of the angle $\alpha_1$ is proportional to the frequency of the signal applied to the terminals 55 and 56.

The intensity of the sub-beams 54 and 57 is defined by the amplitude of the applied signal. As a result, an acousto-optic cell may also be used as an intensity modulator. The apparatus of FIG. 6 might include two of such cells, one of the cells acting as an intensity modulator and the other cell as a direction modulator. However, the two modulators 34 and 44 in an apparatus of FIG. 6 may also be constituted by a single acousto-optic cell in accordance with FIG. 7. Said cell is then controlled by a signal of variable amplitude and variable frequency.

What is claimed is:

1. A record carrier on which information corresponding to a television program is stored in an optically readable structure in the form of first areas alternating with second areas along tracks with lands between successive tracks, said first areas having a different effect on impinging radiation than the second areas and the lands between the tracks, the improvement wherein the track portions, viewed in a direction transverse to the direction in which the tracks are read, are provided with periodic excursions towards and away from adjacent tracks corresponding to line synchronization pulses in said television program, the period of said excursions being substantially greater than the average period of the areas in the tracks and the amplitude of said excursions being smaller than the track width.

2. A record carrier as claimed in claim 1, wherein the consecutive track portions which correspond to the line synchronizing pulses in the television signal are offset in opposite directions.

3. A record disc comprised of a storage medium having information stored in a variable-depth track which comprises a series of convolutions individually having a generally circular mean path to be read by a beam of energy and characterized by the fact that each track convolution has periodic fixed-amplitude lateral undulations disposed symmetrically with respect to its mean path, the undulations of said series of convolutions having such relative phase that said convolutions are in nested concentric relation with a substantially uniform spacing with respect to one another, and further characterized by the fact that the phase of said undulations is correlated with that of a component of the stored information.

4. A record carrier as claimed in claim 3, wherein the phase of the periodic undulations is recorded in an additional track with a periodic structure, which track is destined to be read with the aid of separate elements.

* * * * *